United States Patent Office 2,816,926
Patented Dec. 17, 1957

2,816,926

DIAMINES

Robert Arthur Smiley, Woodbury, N. J., assignor to E. I. du Pont de Nemours and Company, Wilmington, Del., a corporation of Delaware No Drawing. Application October 7, 1955, Serial No. 539,266

7 Claims. (Cl. 260—563)

The present invention relates to novel amines and their preparation. More particularly, the present invention relates to novel tetramines, N,N'-bis[(1-aminocycloalkyl)methyl]alkylene diamines, and a method for preparing the same.

In general, amines are used as corrosion inhibitors, as emulsifiers in gas purification, and in the formation of valuable compounds have also been used in the production of dyes, detergents, textile softeners, and photographic compounds. Recently, amines have found widespread use as curing agents for epoxy resins; however, epoxy resins cured by most amines now commonly used for this purpose are dark, almost black, in color. The dark color of these epoxy resins limits their usefulness in many applications.

Accordingly, an object of the present invention is to provide valuable new amines. Another object of the present invention is to provide valuable new amines by an economically feasible process. A still further object of the present invention is to provide amines which are superior curing agents for epoxy resins. Other objects will become apparent as the invention is further described.

I have found that the foregoing objects may be achieved when I catalytically hydrogenate N,N'-bis[(1-nitrocycloalkyl)methyl]alkylene diamines, which may be prepared according to the method described in detail in my copending application Serial No. 539,265, filed October 7, 1955, by mixing together a nitro cycloalkane, formaldehyde, and an alkylene diamine.

In accordance with the process of the present invention, N,N'-bis[(1-nitrocycloalkyl)methyl]alkylene diamines are catalytically hydrogenated at a temperature within the range of the freezing point of the reaction mixture and the boiling point of the reaction mixture and at atmospheric pressure or superatmospheric pressure.

The following examples illustrate specific embodiments of the method of carrying out the process of the present invention. However, they will be understood to be illustrative only and not to limit the invention in any manner. The parts in the examples are parts by weight unless otherwise designated.

Example 1

About 15 parts of Raney nickel and 205 parts of N,N' - bis[(1 - nitrocyclohexyl)methyl]ethylenediamine were added to 820 parts of 95% ethanol in an autoclave. The mixture was stirred at 35–75° C. and under a hydrogen pressure of 800–1000 p. s. i. ga. until the absorption of hydrogen ceased. Then, the reactor was cooled and vented, and the contents were filtered to remove the catalyst. This procedure was repeated twice, and the filtrates from the three runs were combined. The ethanol was removed from the combined filtrates by distillation at 60 mm. pressure. The residue then was distilled in vacuo. A clear, water-white, viscous liquid which boiled at 171° C. (0.6 mm. pressure) was obtained. The yield of N,N'-bis[(1-aminocyclohexyl)methyl]ethylenediamine was 352 parts (64%).

Example 2

Thirty-seven parts of N,N'-bis[(1-nitrocyclohexyl)methyl]ethylenediamine and about 5 parts of Raney nickel were added to 198 parts of absolute ethanol in a Pyrex shaking bottle. The bottle was placed in a Parr hydrogenator. The hydrogenation was carried out at room temperature and under a hydrogen pressure of 60 p. s. i. ga.; the total reaction time was three hours. At the end of this time, the hydrogen pressure was 5 p. s. i. ga. Then, the reactor was cooled and vented, and the contents were filtered to remove the catalyst. The filtrate was distilled to remove the ethanol. The residue was distilled in vacuo. Fifteen parts (48% yield) of N,N' - bis[(1-aminocyclohexyl)methyl]ethylenediamine was obtained as a colorless viscous oil ($n_D^{25}$, 1.5067) which boiled at 166–168° C. (0.50–0.55 mm. pressure).

The N,N'-bis[(1 - aminocyclohexyl)methyl]ethylenediamine was characterized by elemental analysis.

*Analysis.*—Found: C, 67.80, 67.97; H, 12.30, 12.17; N, 19.54, 19.69. Calcd. for $C_{16}H_{34}N_4$: C, 68.08; H, 12.05; N, 19.85.

Example 3

Forty parts of N,N' - bis[(1-nitrocyclohexyl)methyl]hexamethylenediamine and about 5 parts of Raney nickel were added to 156 parts of absolute ethanol in the reaction vessel. The mixture was shaken at room temperature and under a hydrogen pressure of 10–50 p. s. i. ga. until the absorption of hydrogen ceased. Then, after the contents of the reactor was filtered to remove the catalyst, the ethanol was removed from the filtrate by evaporation. The residue was dissolved in 10% hydrochloric acid, and the acidic solution was extracted with diethyl ether. The ether extract was discarded, and the aqueous solution was made basic with 10% sodium hydroxide solution. The insoluble tetramine which formed was taken up in diethyl ether; the ether extract was dried over anhydrous magnesium sulfate, filtered, and distilled to remove the ether. The residue was distilled in vacuo. A 46.5% yield (16 parts) was obtained of N,N' - bis[(1 - aminocyclohexyl)methyl]hexamethylenediamine, a colorless, viscous liquid ($n_D^{25}$, 1.4995) which boiled at 194° C. (0.1 mm. pressure).

*Analysis.*—Found: C, 71.08, 71.01; H, 12.55, 12.47; N, 16.35, 16.27. Calcd. for $C_{20}H_{42}N_4$: C, 71.00; H, 12.42; N, 16.51.

In general, the subject compounds are slightly or completely miscible in water and completely miscible in all proportions in acetone, diethyl ether, ethanol, petroleum ether, toluene, carbon tetrachloride, n-propyl nitrate, ethyl benzoate, cyclohexane, and most other common organic solvents.

The N,N'-bis[(1-aminocycloalkyl)methyl]alkylene diamines were found to be excellent curing agents for epoxy resins. The following table illustrates the effectiveness (as indicated by the appearance of the cured resin) of two of these novel amines in curing an epoxy resin in a comparison with two other amines now used commercially for this purpose.

| Amine used as curing agent | Amt.[1] of amine (g.) | Appearance of cured resin |
| --- | --- | --- |
| m-Phenylenediamine | 6.21 | Black, almost opaque. |
| Methylenedianiline | 11.39 | Very dark. |
| N,N'-bis[(1-aminocyclohexyl)-methyl]ethylene-diamine. | 5.17 | Light colored, clear. |
| N,N'-bis[(1-aminocyclohexyl)-methyl]hexamethylene-diamine. | 15.7 | Do. |

In each case, the amine was used to cure 50 grams of Ciba Co. Inc. "Araldite" #6020 epoxy resin for 24 hrs. at 120° C.

[1] Equivalent amts. of each amine (based on the number of active hydrogen atoms) were used.

Moreover, when the novel tetramines were substituted for common amine curing agents (dimethyl- and diethyl-aminopropylamine) in epoxy resin coating compositions, the pot life (time during which the composition remains mobile and free-flowing) was substantially increased, e. g., from 1 or 2 days for compositions containing the common curing agents to 18 days for compositions containing the novel amines.

Additionally, the subject amines are excellent chelating agents for heavy metals, such as copper, cobalt, and nickel. Moreover, the N,N'-bis[(1-aminocycloalkyl)methyl]-alkylene diamines find use as metal deactivators because of their high solubility in hydrocarbons and their chelating ability.

As illustrated by the examples, the N,N'-bis[(1-nitrocycloalkyl)methyl]alkylene diamines are converted to the corresponding tetramines in good yields by passing hydrogen through a mixture of one of the dinitro compounds, a catalyst, and a suitable solvent. Such solvents include low-molecular-weight alkanols such as methanol, ethanol, an isopropanol; ethers such as dioxane; hydrocarbons such as benzene, cyclohexane, and petroleum ether; and mixtures of a low-molecular-weight alkanol and water such as a 50/50 mixture of ethanol and water. The amount of the solvent is not critical. Usually, about a four-fold amount (by weight) of solvent (based on the weight of the dinitro compound) is sufficient.

The hydrogenation of the nitro compound to the amino compound is carried out in the presence of a suitable hydrogenation catalyst. This catalyst may be any one of the well known catalysts used for this purpose. Such catalysts include Raney nickel; nickel oxides; finely divided metals of group VIII of the periodic table, such as nickel, iron, cobalt, platinum, palladium, or rhodium; group VIII metals supported on pumice, asbestos, kieselguhr, alumina, silica gel, or charcoal; finely divided copper; copper supported on pumice, asbestos, kieselguhr, alumina, silica gel, or charcoal; palladium or platinum black; colloidal palladium or platinum; and platinum sponge. The amount of catalyst employed depends upon such reaction variables as temperature, pressure, duration of run, etc., and is not critical in that an excess of catalyst has no deleterious effects on the yields obtained by the present process. Moreover, after completion of the hydrogenation, the catalyst may be removed from the reaction mixture by filtration and regenerated by a conventional method. Quantities of catalyst as low as one part per million parts of nitro compound are operable, but larger amounts are preferred in order to permit shorter reaction periods.

The N,N'-bis[(1-nitrocycloalkyl)methyl]alkylene diamines may be hydrogenated at a temperature within the range of the freezing point of the mixture and the boiling point of the mixture under the reaction conditions. However, the use of a temperature within the range of 20° C. and the boiling point of the mixture under the reaction conditions provides good yields and is preferable from the viewpoint of economics. The use of lower temperatures requires external cooling and longer reaction times; the use of higher temperatures may cause the loss of constituents of the mixture.

In effecting the hydrogenation of the dinitro compound, pressures ranging from atmospheric pressure up to the maximum pressure permitted by the mechanical limitations of available equipment can be employed, i. e., 1–1000 atmospheres. Although entirely satisfactory yields of the tetramines are obtained when atmospheric pressure is used, the use of higher pressures is advantageous because thereby the reaction rate is increased and the reaction time is decreased.

The N,N'-bis[(1-aminocycloalkyl)methyl]alkylene diamines are separated from reaction mixtures by filtering off the catalyst and insoluble material, distilling off the solvent, and thereafter distilling the residue at reduced pressure.

As illustrated by the examples, N,N'-bis-[(1-nitrocycloalkyl)methyl]alkylene diamines in which the nitrocycloalkyl groups are nitrocyclohexyl and the alkylene group is ethylene or hexamethylene can be converted to the corresponding amino compounds in good yields by the process of the present invention. However, N,N'-bis-[(1-nitrocycloalkyl)methyl]alkylene diamines containing other nitrocycloalkyl groups, e. g., nitrocycloheptyl or nitrocyclopentyl, and other alkylene groups, e. g., propylene or pentamethylene, can also be converted to the corresponding amino compounds by the present process.

Although the preceding examples illustrate the process as a batchwise process, the process of the present invention also may be carried out in a continuous manner. For example, an N,N'-bis[(1-nitrocycloalkyl)methyl]-alkylene diamine and a catalyst may be introduced continuously into a reaction zone into which hydrogen is passed continuously and from which the hydrogenation product is removed continuously.

Equally feasible, also, is the combination of the process of the present invention with the process described in my copending application Serial No. 539,265, filed October 7, 1955, by which the N,N'-bis[(1-nitrocycloalkyl)methyl]alkylene diamines are prepared. Accordingly, the hydrogen and a catalyst may be introduced directly into the mixture formed by the reaction of the nitro cycloalkane, formaldehyde, and the alkylene diamine, and the tetramine thus formed may be separated from the reaction mixture by the previously described method.

The invention has been described in detail in the foregoing. It will be apparent to those skilled in the art that many variations are possible without departure from the scope of the invention. I intend, therefore, to be limited only by the following claims.

I claim:

1. N,N'-bis[(1-aminocycloalkyl)methyl]alkylene diamines.

2. A process for the preparation of N,N'-bis[(1-aminocycloalkyl)methyl]alkylene diamines which comprises hydrogenating N,N'-bis[(1-nitrocycloalkyl)methyl]alkylene diamines in a solvent selected from the group consisting of low-molecular-weight alkanols, mixtures of a low-molecular-weight alkanol and water, ethers, and hydrocarbons and in the presence of a hydrogenation catalyst.

3. Process according to claim 2, wherein the hydrogenation catalyst is selected from the group consisting of finely divided metals of group VIII of the periodic table and supported metals of group VIII of the periodic table.

4. Process for the preparation of N,N'-bis[(1-aminocycloalkyl)methyl]alkylene diamines which comprises hydrogenating N,N'-bis[(1-nitrocycloalkyl)methyl]alkylene diamines in a solvent selected from the group consisting of low-molecular-weight alkanols, mixtures of a low-molecular-weight alkanol and water, ethers, and hydrocarbons and in the presence of a hydrogenation catalyst at a temperature within the range of 20° C. and the boiling point of the mixture under the reaction conditions and a pressure within the range of atmospheric pressure and 1000 atmospheres.

5. N,N' - bis[(1 - aminocyclohexyl)methyl]ethylenediamine.

6. A process for the preparation of N,N'-bis[(1-aminocyclohexyl)methyl]ethylenediamine which comprises hydrogenating N,N'-bis[(1 - nitrocyclohexyl)methyl]ethylenediamine in a solvent selected from the group consisting of low-molecular-weight alkanols, mixtures of a low-molecular-weight alkanol and water, ethers, and hydrocarbons and in the presence of a hydrogenation catalyst at a temperature within the range of 20° C. and the boiling point of the mixture under the reaction conditions, removing insoluble material from said reaction mixture, and thereafter recovering said tetramine.

7. N,N'-bis[(1 - aminocyclohexyl)methyl]hexamethylenediamine.

References Cited in the file of this patent
UNITED STATES PATENTS

| | | |
|---|---|---|
| 2,132,389 | Bertsch | Oct. 11, 1938 |
| 2,413,153 | O'Loughlin | Dec. 24, 1946 |
| 2,606,925 | Whitman | Aug. 12, 1952 |
| 2,627,491 | Szabo et al. | Feb. 3, 1953 |
| 2,739,981 | Szabo et al. | Mar. 27, 1956 |